United States Patent
Morimura et al.

(10) Patent No.: US 11,610,488 B2
(45) Date of Patent: Mar. 21, 2023

(54) NOTIFICATION DEVICE AND VEHICLE CONTROL DEVICE

(71) Applicant: Toyota Jidosha Kabushiki Kaisha, Toyota (JP)

(72) Inventors: Junichi Morimura, Shizuoka-ken (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 181 days.

(21) Appl. No.: 16/719,085

(22) Filed: Dec. 18, 2019

(65) Prior Publication Data

US 2020/0211396 A1   Jul. 2, 2020

(30) Foreign Application Priority Data

Dec. 28, 2018   (JP) .............................. JP2018-246707

(51) Int. Cl.
| | |
|---|---|
| *G08G 1/16* | (2006.01) |
| *G05D 1/00* | (2006.01) |
| *G05D 1/02* | (2020.01) |

(52) U.S. Cl.
CPC ........... *G08G 1/166* (2013.01); *G05D 1/0088* (2013.01); *G05D 1/0276* (2013.01); *G08G 1/167* (2013.01); *G05D 2201/0213* (2013.01)

(58) Field of Classification Search
CPC ...... G08G 1/166; G08G 1/167; G05D 1/0088; G05D 1/0276; G05D 2201/0213
See application file for complete search history.

(56) References Cited

U.S. PATENT DOCUMENTS

| | | | |
|---|---|---|---|
| 2010/0019891 A1* | 1/2010 | Mudalige | G08G 1/167 340/425.5 |
| 2017/0076605 A1* | 3/2017 | Suzuki | G08G 1/133 |
| 2018/0025643 A1* | 1/2018 | Yamamoto | B60W 30/09 701/23 |
| 2018/0105185 A1* | 4/2018 | Watanabe | B60K 37/06 |
| 2019/0088137 A1* | 3/2019 | Yamada | B60R 1/06 |
| 2019/0287397 A1* | 9/2019 | Wiebel-Herboth | G08G 1/091 |
| 2021/0180987 A1* | 6/2021 | Terada | G01C 21/30 |

FOREIGN PATENT DOCUMENTS

| | | | |
|---|---|---|---|
| GB | 2531084 A | | 4/2016 |
| JP | 2010-079565 A | | 4/2010 |
| JP | 2020057079 A | * | 4/2020 |
| JP | 2020107026 A | * | 7/2020 |
| WO | WO-2020194715 A1 | * | 10/2020 |

* cited by examiner

*Primary Examiner* — Hunter B Lonsberry
*Assistant Examiner* — Elizabeth Yang
(74) *Attorney, Agent, or Firm* — Dinsmore & Shohl LLP

(57) ABSTRACT

A notification device includes a recognition unit configured to recognize a plurality of surrounding vehicles, a notification unit configured to provide information as a notification toward an outside of a vehicle, a determination unit configured to determine whether or not at least one of the plurality of surrounding vehicles recognized by the recognition unit is an entering vehicle going to pass in front of the vehicle, and a notification control unit configured to cause the notification unit to notify the entering vehicle of a recognition result of the recognition unit when the determination unit determines that at least one of the plurality of surrounding vehicles is the entering vehicle.

6 Claims, 12 Drawing Sheets

NOTIFICATION DEVICE AND VEHICLE CONTROL DEVICE

CROSS-REFERENCE TO RELATED APPLICATION

This application claims priority to Japanese Patent Application No. 2018-246707 filed with Japan Patent Office on Dec. 28, 2018, the entire contents of which are hereby incorporated by reference.

TECHNICAL FIELD

The present disclosure relates to a notification device and a vehicle control device.

BACKGROUND

British Patent No. 2531084 discloses a vehicle traveling by automatic driving. The vehicle is provided with a light source providing information for a pedestrian. The vehicle notifies a pedestrian standing by in front of the vehicle of stopping of the vehicle by controlling the lighting state of the light source.

SUMMARY

The object of the notification provided by the vehicle described in British Patent No. 2531084 is a non-motorized traffic participant such as a pedestrian. It is conceivable to change the object of the notification from a pedestrian to a surrounding vehicle present around the vehicle. Examples of a scene to which the change is applied include a driving scene in which an entering vehicle is present that is going to pass in front of a vehicle having a notification function (notification vehicle) from, for example, a junction road in front of the notification vehicle. In the driving scene, the entering vehicle is expected to smoothly pass in front of the notification vehicle by the notification vehicle notifying the entering vehicle of stopping of the notification vehicle.

However, it may be difficult for the entering vehicle to recognize a situation other than the notification vehicle although the entering vehicle easily recognizes the notification vehicle in front. From the viewpoint of traffic facilitation, there is room for improvement as to notification with respect to the entering vehicle going to pass in front of the notification vehicle.

An aspect of the present disclosure relates to a notification device which is provided in a vehicle and provides information as a notification with respect to a surrounding vehicle present around the vehicle. The notification device includes a recognition unit configured to recognize a plurality of the surrounding vehicles, a notification unit configured to provide the information as a notification toward an outside of the vehicle, a determination unit configured to determine whether or not at least one of the plurality of surrounding vehicles recognized by the recognition unit is an entering vehicle going to pass in front of the vehicle, and a notification control unit configured to cause the notification unit to notify the entering vehicle of a recognition result of the recognition unit when the determination unit determines that at least one of the plurality of surrounding vehicles is the entering vehicle.

According to the notification device, the entering vehicle is notified of the recognition result of the recognition unit when it is determined that at least one of the plurality of surrounding vehicles is the entering vehicle. Accordingly, the notification device is capable of causing the entering vehicle to grasp a situation of a surrounding vehicle other than the vehicle equipped with the notification device. As a result, the notification device contributes to traffic facilitation.

In one embodiment, the notification device may include an object determination unit configured to determine whether or not the surrounding vehicle is present in a blind spot region corresponding to the entering vehicle. The notification control unit may be configured to cause the notification unit to notify the entering vehicle of information on the surrounding vehicle present in the blind spot region when the object determination unit determines that the surrounding vehicle is present in the blind spot region. In this case, the notification device is capable of causing the entering vehicle to grasp a situation of the surrounding vehicle in the blind spot region.

In one embodiment, the entering vehicle may be a surrounding vehicle going to cross a traveling lane of the vehicle and enter an opposite lane opposite to the traveling lane. The notification control unit may be configured to cause the notification unit to notify the entering vehicle of at least one of information on a surrounding vehicle traveling behind the vehicle and information on a surrounding vehicle traveling in the opposite lane. In this case, the notification device is capable of causing the entering vehicle to grasp a surrounding vehicle traveling in the opposite lane or behind the vehicle.

In one embodiment, the notification control unit may be configured to cause the notification unit to notify the surrounding vehicle traveling in the opposite lane in front of the vehicle of information on the entering vehicle. In this case, the notification device is capable of causing the surrounding vehicle traveling in the opposite lane to grasp the entering vehicle.

In one embodiment, the notification control unit may be configured to cause the notification unit to notify the surrounding vehicle traveling behind the vehicle of information on the entering vehicle. In this case, the notification device is capable of causing the surrounding vehicle traveling behind the vehicle to grasp the entering vehicle.

Another aspect of the present disclosure relates to a vehicle control device causing a vehicle to travel by automatic driving. The vehicle control device includes a recognition unit configured to recognize a plurality of surrounding vehicles present around the vehicle, a notification unit configured to provide information as a notification toward an outside of the vehicle, a determination unit configured to determine whether or not at least one of the plurality of surrounding vehicles recognized by the recognition unit is an entering vehicle going to pass in front of the vehicle, an automatic driving unit configured to determine whether or not to prioritize traveling of the entering vehicle over traveling of the vehicle when the determination unit determines that at least one of the plurality of surrounding vehicles is the entering vehicle, and a notification control unit configured to cause the notification unit to notify the entering vehicle of a recognition result of the recognition unit when the automatic driving unit determines that traveling of the entering vehicle is prioritized over traveling of the vehicle.

According to the vehicle control device, the entering vehicle is notified of the recognition result of the recognition unit when the automatic driving unit determines that priority is given to the traveling of the entering vehicle over the traveling of the vehicle. Accordingly, the vehicle control device is capable of causing an entering vehicle traveling with priority to grasp a situation of a surrounding vehicle other than the vehicle equipped with the notification device. As a result, the vehicle control device contributes to traffic facilitation.

According to various aspects and embodiments of the present disclosure, it is possible to improve notification with respect to an entering vehicle going to pass in front of a vehicle.

DETAILED DESCRIPTION

Figure 1:
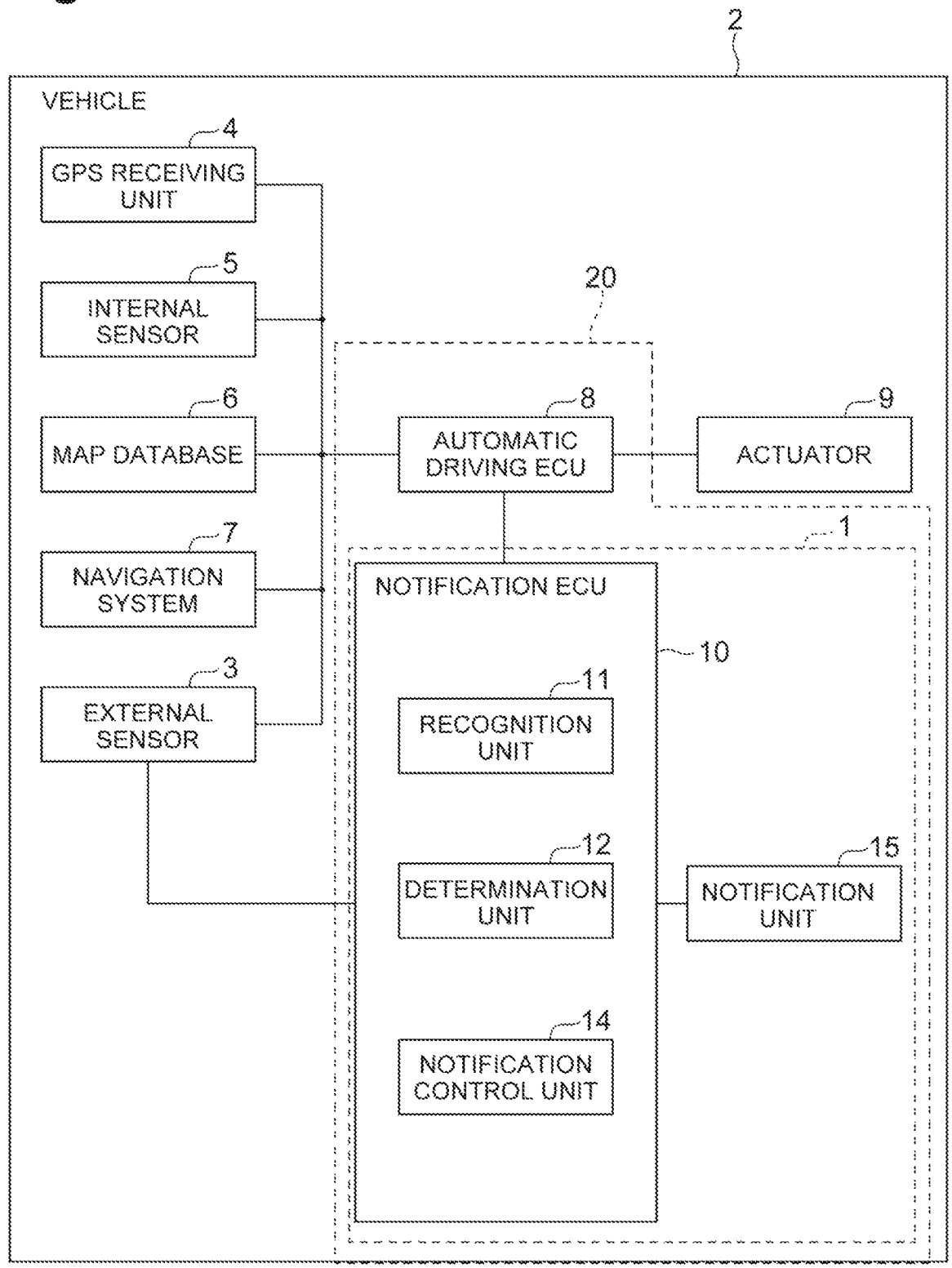
FIG. 1 is a functional block diagram of an example of a vehicle including a notification device according to a first embodiment.

Hereinafter, exemplary embodiments will be described with reference to accompanying drawings. In the following description, the same or corresponding elements are denoted by the same reference numerals without redundant description.

First Embodiment (Configurations of Vehicle and Notification Device)

FIG. 1 is a functional block diagram of an example of a vehicle 2 including a notification device 1 according to a first embodiment. As illustrated in FIG. 1, the notification device 1 is mounted in the vehicle 2 such as a passenger car and performs information notification with respect to a surrounding vehicle present around the vehicle. The vehicle 2 is, for example, a vehicle traveling by automatic driving. The automatic driving is vehicle control by which the vehicle 2 automatically travels toward a preset destination. The destination may be set by an occupant such as a driver or may be automatically set by the vehicle 2. During the automatic driving, there is no need for the driver to perform a driving operation and the vehicle 2 automatically travels.

The vehicle 2 is provided with an external sensor 3, a GPS receiving unit 4, an internal sensor 5, a map database 6, a navigation system 7, an automatic driving ECU 8 (an example of an automatic driving unit), and an actuator 9.

The external sensor 3 is a detection device detecting a situation around the vehicle 2. The external sensor 3 detects the position of an object in front of the vehicle 2 on the roadway on which the vehicle 2 travels. The external sensor 3 includes at least one of a camera and a radar sensor.

The camera is an imaging device imaging an external situation of the vehicle 2. The camera is provided on, for example, the back side of the windshield of the vehicle 2. The camera acquires imaging information regarding the external situation of the vehicle 2. The camera may be at least one of a monocular camera and a stereo camera. The stereo camera has two imaging units disposed to reproduce binocular parallax. Depth-direction information is included in the imaging information of the stereo camera.

The radar sensor is a detection device detecting an object around the vehicle 2 by using at least one of radio waves (such as millimeter waves) and light. The radar sensor includes, for example, at least one of a millimeter wave radar sensor and a laser imaging detection and ranging (LIDAR) sensor. The radar sensor transmits at least one of radio waves and light around the vehicle 2 and detects an object by receiving at least one of radio waves and light reflected by the object.

The GPS receiving unit 4 receives signals from three or more GPS satellites and acquires position information indicating the position of the vehicle 2. The position information includes, for example, latitude and longitude. Other means capable of specifying the latitude and the longitude at which the vehicle 2 is present may be used in place of the GPS receiving unit 4.

The internal sensor 5 is a detection device detecting the traveling state of the vehicle 2. The internal sensor 5 includes a vehicle speed sensor, an acceleration sensor, and a yaw rate sensor. The vehicle speed sensor is a detector detecting the speed of the vehicle 2. Used as the vehicle speed sensor is a vehicle wheel speed sensor provided with respect to, for example, at least one of a vehicle wheel of the vehicle 2 and a drive shaft rotating integrally with the wheel and detecting the rotation speed of the vehicle wheel.

The acceleration sensor is a detector detecting the acceleration of the vehicle 2. The acceleration sensor may include a longitudinal acceleration sensor detecting the longitudinal acceleration of the vehicle 2 and a lateral acceleration sensor detecting the acceleration of the vehicle 2. The yaw rate sensor is a detector detecting the yaw rate (rotational angular velocity) around the vertical axis at the center of gravity of the vehicle 2. A gyro sensor and the like can be used as the yaw rate sensor.

The map database 6 is a storage device storing map information. The map database 6 is stored in, for example, a hard disk drive (HDD) mounted in the vehicle 2. The map database 6 includes, as the map information, information on a stationary object, traffic rules, the position of a traffic signal, and the like. Examples of the stationary object include road surface paint (including lane boundary lines such as white and yellow lines) and structures (such as curbs, poles, telephone poles, buildings, signs, and trees). Some of the map information included in the map database 6 may be stored in a storage device different from the HDD in which the map database 6 is stored. Some or all of the map information included in the map database 6 may be stored in a storage device other than the storage device provided in the vehicle 2.

The navigation system 7 is a system guiding the driver of the vehicle 2 to a preset destination. The navigation system 7 recognizes the traveling road on which the vehicle 2 travels and the traveling lane in which the vehicle 2 travels based on the position of the vehicle 2 measured by the GPS receiving unit 4 and the map information of the map database 6. The navigation system 7 calculates a target route from the position of the vehicle 2 to the destination and guides the driver along the target route by using a human machine interface (HMI).

The actuator 9 is a device executing traveling control for the vehicle 2. The actuator 9 includes at least an engine actuator, a brake actuator, and a steering actuator. The engine actuator controls the drive force of the vehicle 2 by changing the amount of air supplied to an engine (by changing a throttle opening degree or the like) in accordance with a control signal from the automatic driving ECU 8. When the vehicle 2 is at least one of a hybrid vehicle and an electric vehicle, the engine actuator controls the drive force of a motor as a power source.

The automatic driving ECU 8 controls the vehicle 2. The ECU is an electronic control unit having a central processing unit (CPU), a read only memory (ROM), a random access memory (RAM), a controller area network (CAN) communication circuit, and the like. The automatic driving ECU 8 is connected to a network communicating by using the CAN communication circuit or the like and is communicably connected to the components of the vehicle 2 described above. The automatic driving ECU 8 realizes the automatic driving function by, for example, inputting and outputting data by operating the CAN communication circuit based on a signal output by the CPU, storing the data in the RAM, loading a program stored in the ROM into the RAM, and executing the program loaded in the RAM. A plurality of electronic control units may constitute the automatic driving ECU 8.

The automatic driving ECU 8 recognizes objects around the vehicle 2 (including the positions of the objects) based on, for example, at least one of the map database 6 and the detection result of the external sensor 3. The objects include a dynamic object such as a pedestrian, a bicycle, and another vehicle as well as a stationary and non-moving object such as a telephone pole, a guardrail, a tree, and a building. For example, the automatic driving ECU 8 recognizes an object each time the automatic driving ECU 8 acquires a detection result from the external sensor 3. The automatic driving ECU 8 may recognize an object by another known method.

For example, the automatic driving ECU 8 detects a dynamic object from recognized objects by using the stationary object information included in the map database 6. The automatic driving ECU 8 may detect a dynamic object by another known method.

The automatic driving ECU 8 applies a Kalman filter, a particle filter, or the like to a detected dynamic object and detects the amount of movement of the dynamic object at that point in time. The amount of movement includes the direction of movement of the dynamic object and the speed of movement of the dynamic object. The amount of movement may include the rotation speed of the dynamic object. In addition, the automatic driving ECU 8 may perform error estimation on the amount of movement.

The automatic driving ECU 8 recognizes the traveling state of the vehicle 2 based on the detection result of the internal sensor 5 (such as the vehicle speed information of the vehicle speed sensor, the acceleration information of the acceleration sensor, and the yaw rate information of the yaw rate sensor). The traveling state of the vehicle 2 includes, for example, the vehicle speed, the acceleration, and the yaw rate.

The automatic driving ECU 8 recognizes a boundary line of the lane in which the vehicle 2 travels based on the detection result of the external sensor 3.

The automatic driving ECU 8 generates the path of the vehicle 2 based on, for example, the detection result of the external sensor 3, the map database 6, the position of the vehicle 2 recognized on a map, information on a recognized object (including a lane boundary line), and the recognized traveling state of the vehicle 2. At this time, the automatic driving ECU 8 generates the path of the vehicle 2 by assuming the behavior of an object around the vehicle 2. Examples of the object behavior assumption include an assumption that every object around the vehicle 2 is stationary, an assumption that a dynamic object independently moves, and an assumption that a dynamic object moves while interacting with at least one of another object and the vehicle 2.

The automatic driving ECU 8 generates a plurality of path candidates for the vehicle 2 by using a plurality of assumptions. The path candidate includes at least one path for the vehicle 2 to travel while avoiding an object. The automatic driving ECU 8 selects one path by using, for example, the degree of reliability of each path candidate.

The automatic driving ECU 8 generates a traveling plan in accordance with the selected path. The automatic driving ECU 8 generates the traveling plan in accordance with the path of the vehicle 2 based on the detection result of the external sensor 3 and the map database 6. The automatic driving ECU 8 generates the traveling plan within a range not exceeding the speed limit of the traveling lane by using the speed limit stored in the map database 6. In addition, the automatic driving ECU 8 generates the traveling plan in which the vehicle 2 travels within a range not exceeding a predetermined upper limit speed.

The automatic driving ECU 8 outputs the traveling plan to be generated as having a plurality of configuration coordinates (p, V). Each of the configuration coordinates (p, V) is a set of two elements. One of the elements is a target position p in the coordinate system fixed to the vehicle 2 with regard to the path of the vehicle 2. The other element is a speed V at each target point. Here, each target position p has at least the positions of the x and y coordinates in the coordinate system fixed to the vehicle 2 or information equivalent thereto. The traveling plan is not particularly limited insofar as the traveling plan describes a behavior of the vehicle 2. For example, the traveling plan may use a target time t instead of the speed V or the target time t and the direction of the vehicle 2 at that point in time may be added. The traveling plan may be data indicating the transition of the vehicle speed of the vehicle 2, the acceleration and deceleration of the vehicle 2, the steering torque of the vehicle 2, or the like at a time when the vehicle 2 travels along the path. The traveling plan may include the speed pattern of the vehicle 2, the acceleration and deceleration pattern of the vehicle 2, and the steering pattern of the vehicle 2.

The automatic driving ECU 8 automatically controls the traveling of the vehicle 2 based on the generated traveling plan. The automatic driving ECU 8 outputs a control signal corresponding to the traveling plan to the actuator 9. As a result, the automatic driving ECU 8 controls the traveling of the vehicle 2 such that the vehicle 2 automatically travels along the traveling plan.

The notification device 1 is provided with a notification ECU 10 and a notification unit 15. The notification ECU 10 is an electronic control unit controlling information notification with respect to a pedestrian. A plurality of ECUs may constitute the notification ECU 10 or the notification ECU 10 may be included in the automatic driving ECU 8. The notification unit 15 is a device provided in the vehicle 2 and performing information notification toward the outside of the vehicle. The notification unit 15 is connected to the notification ECU 10 and performs information notification based on an output signal of the notification ECU 10.

Information provided as a notification by the notification unit 15 is notification information to be provided for a surrounding vehicle present around the vehicle 2. The surrounding vehicle is, for example, a vehicle present in the range that can be recognized by external sensor 3 of vehicle 2. The surrounding vehicle may not be an automobile and may include a moving body such as a motorcycle and a bicycle. The information can be a result obtained by means of the external sensor 3 such as the detection or recognition information of the vehicle 2. The information may be a result obtained by means of the internal sensor 5 such as the speed or acceleration information of the vehicle 2. Alternatively, the information may be information obtained from the automatic driving ECU 8 such as the current or future behavior of the vehicle 2. Although the information to be provided as a notification is a surrounding vehicle recognition result in the following description, the present disclosure is not limited thereto.

Figure 2A:
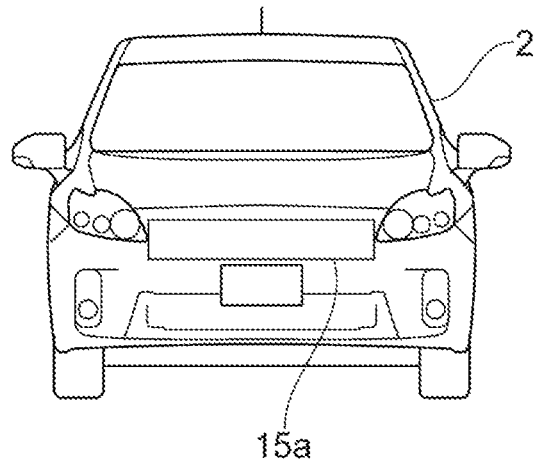
FIG. 2A is a diagram illustrating an example of a vehicle mounting position of a notification unit.
Figure 2B:
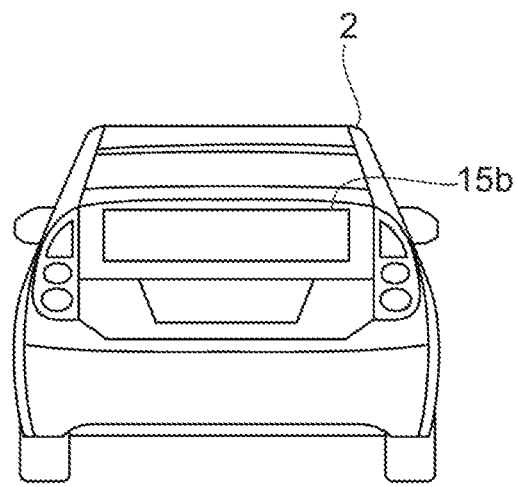
FIG. 2B is another diagram illustrating an example of a vehicle mounting position of a notification unit.
Figure 2C:
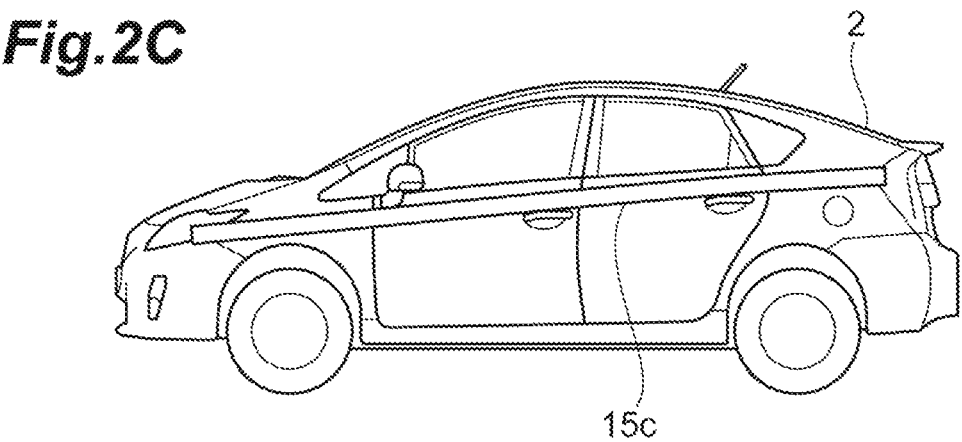
FIG. 2C is another diagram illustrating an example of a vehicle mounting position of a notification unit.

The notification unit 15 is a display device or the like. The notification unit 15 is disposed at a position visible from at least one of the front, the rear, and the side of the vehicle 2. FIGS. 2A to 2C are diagrams illustrating an example of the vehicle mounting position of the notification unit. As illustrated in FIG. 2A, a front display device 15a is provided in the grille portion on the front surface of the vehicle 2 as the notification unit 15. In addition, as illustrated in FIG. 2B, a rear display device 15b is provided on the back surface of the vehicle 2 as the notification unit 15. Further, as illustrated in FIG. 2C, a side display device 15c is provided on the side surface of the vehicle 2 as the notification unit 15. The notification unit 15 is not limited to the example illustrated in FIGS. 2A to 2C. A plurality of display devices may be provided in the grille portion of the front surface of the vehicle 2 or a plurality of display devices may be provided on the back or side surface of the vehicle 2.

The notification ECU 10 is provided with a recognition unit 11, a determination unit 12, and a notification control unit 14.

The recognition unit 11 recognizes a surrounding vehicle based on the detection result of the external sensor 3. The recognition unit 11 determines, by using a technique such as pattern matching, whether or not objects detected by the external sensor 3 are a plurality of surrounding vehicles.

The determination unit 12 determines whether or not at least one of the surrounding vehicles recognized by the recognition unit 11 is an entering vehicle. The entering vehicle is a vehicle going to pass in front of the vehicle 2. The vehicle passing in front of the vehicle 2 is a vehicle traveling to intersect with the planned path of the vehicle 2. When the road is divided into lanes, the entering vehicle is a vehicle traveling across the traveling lane of the vehicle 2. For example, when the vehicle 2 travels straight in the lane closest to the roadside, the entering vehicle is a vehicle standing by on the roadside ahead of the vehicle 2 and going to enter the lane opposite to the lane of the vehicle 2 or the lane closer to the middle side of the road than the traveling lane of the vehicle 2. The entering vehicle can also be a vehicle going to pass in front of the vehicle 2 in a place without a traffic signal. The determination unit 12 determines the presence or absence of the entering vehicle based on the traveling directions and the speeds of the plurality of surrounding vehicles, the lighting states of direction indicators, and the like. For example, when a vehicle approaching the traveling road of the vehicle 2 at a low speed equal to or less than a predetermined speed with a direction indicator on in the direction intersecting with the planned path of the vehicle 2 is present, the determination unit 12 determines that the vehicle is an entering vehicle.

When the determination unit 12 determines that at least one of the surrounding vehicles is an entering vehicle, the notification control unit 14 causes the notification unit 15 to notify the entering vehicle of the recognition result of the recognition unit 11. For example, the notification control unit 14 generates, for each surrounding vehicle, object information indicating the position and the movement of a pedestrian based on the position and the movement of the surrounding vehicle recognized by the recognition unit 11. The notification control unit 14 causes the notification unit 15 visible from the entering vehicle to provide the generated object information as a notification. As a result, the entering vehicle is notified of the surrounding vehicle recognition result of the vehicle 2.

(Details of Determination Unit and Notification Control Unit)

Figure 3:
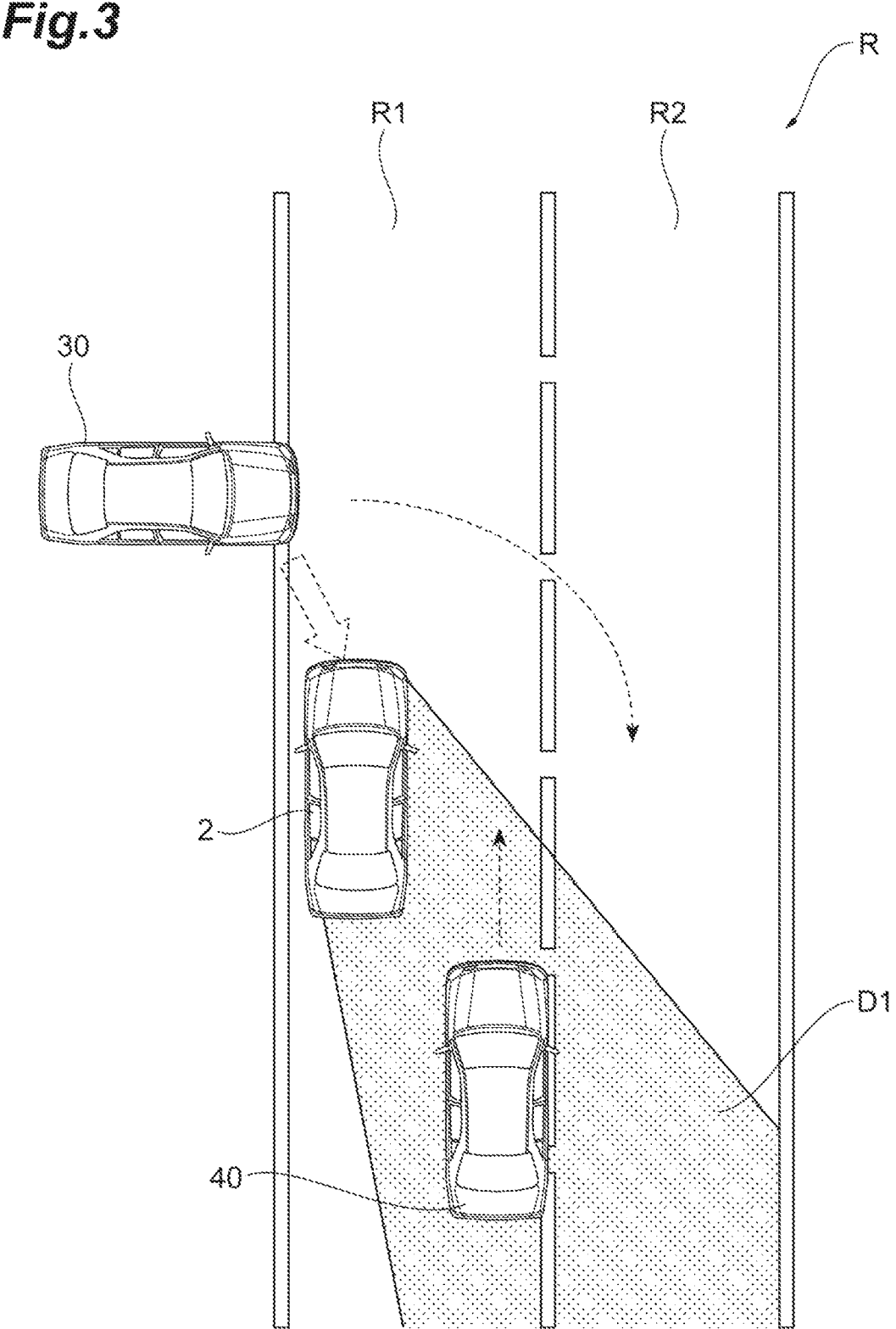
FIG. 3 is a diagram illustrating an example of a driving scene in which the notification device performs notification.

FIG. 3 is a diagram illustrating an example of a driving scene in which the notification device performs notification. In FIG. 3, the vehicle 2 travels in a first lane R1 as a traveling lane on a road R. The road R includes a second lane R2 adjacent to the first lane R1. The second lane R2 is an opposite lane as viewed from the vehicle 2. A first vehicle 30 is present in front of the vehicle 2 and a second vehicle 40 is present behind the vehicle 2. The first vehicle 30 and the second vehicle 40 are detected by the external sensor 3 of the vehicle 2 and recognized by the recognition unit 11.

The determination unit 12 determines whether or not the first vehicle 30 and the second vehicle 40 are entering vehicles. The first vehicle 30 is going to cross the first lane R1 as the traveling lane of the vehicle 2 and enter the second lane R2 as the opposite lane. Accordingly, the first vehicle 30 approaches the traveling road of the vehicle 2, the speed of the first vehicle 30 is a low speed equal to or less than a predetermined speed, and the direction indicator of the first vehicle 30 indicates that the first vehicle 30 heads towards the second lane R2 as the opposite lane. Accordingly, the determination unit 12 determines that the first vehicle 30 is an entering vehicle. The second vehicle 40 is present behind the vehicle 2, and thus the second vehicle 40 does not pass in front of the vehicle 2 and the determination unit 12 determines that the second vehicle 40 is not an entering vehicle.

The first vehicle 30 is scheduled to enter the second lane R2 by turning to the right to cross the first lane R1. This entering is realized when there is a sufficient gap between the vehicles in the first lane R1 and there is a sufficient gap between the vehicles in the second lane R2. Although the driver of the first vehicle 30 (recognition unit when the first vehicle 30 is an automatic driving vehicle) needs to check the surroundings as to the entering is possible, there is a possibility that it is difficult to see objects other than the vehicle 2. For example, in the driving scene of FIG. 3, the vehicle 2 blocks the view of the first vehicle 30 (dotted arrow in FIG. 3), and thus a blind spot region D1 is formed behind the vehicle 2. In other words, there is a possibility that the first vehicle 30 is incapable of noticing the second vehicle 40 even if the second vehicle 40 is present behind the vehicle 2.

Figure 4A:
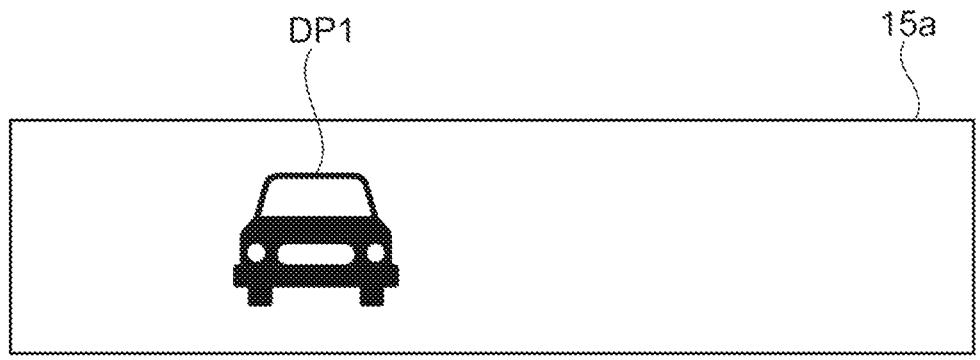
FIG. 4A is a diagram illustrating an example of the notification content of the notification unit.
Figure 4B:
FIG. 4B is another diagram illustrating an example of the notification content of the notification unit.
Figure 4C:
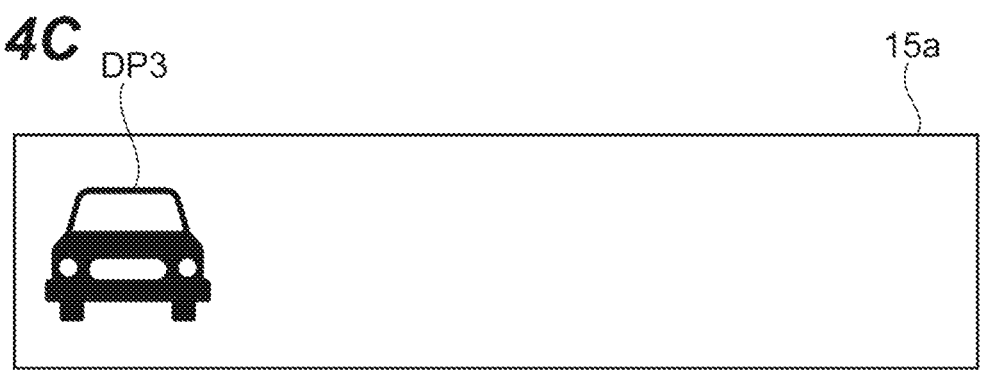
FIG. 4C is another diagram illustrating an example of the notification content of the notification unit.

Accordingly, the notification control unit 14 controls the notification unit 15 to notify the first vehicle 30 of the presence of the second vehicle 40. The notification control unit 14 selects the front display device 15a as the notification unit 15 to be operated based on the position of the first vehicle 30. FIGS. 4A to 4C are diagrams illustrating an example of the notification content of the notification unit. FIGS. 4A to 4C are display examples of the front display device 15a, which are arranged in chronological order. The notification control unit 14 determines the position at which information is to be displayed in the display region of the front display device 15a in accordance with the distance between and directions of the second vehicle 40 and the vehicle 2. For example, as illustrated in FIG. 4A, a vehicle object DP1 is displayed in the display region near the middle of the front display device 15a. The vehicle object DP1 is information for providing the recognition result of the second vehicle 40 as a notification. When the speed of the second vehicle 40 is faster than the speed of the vehicle 2, the second vehicle 40 approaches the vehicle 2 from behind. The display position of the vehicle object is changed in accordance with the distance between the vehicle 2 and the second vehicle 40. For example, as illustrated in FIG. 4B, the notification control unit 14 causes a vehicle object DP2 to be displayed outside the vehicle object DP1 illustrated in FIG. 4A. Then, the notification control unit 14 causes a vehicle object DP3 to be displayed outside the vehicle object DP2 illustrated in FIG. 4B with time as illustrated in FIG. 4C. The vehicle objects DP1 to DP3 may be changed to become larger as the distance between the vehicle 2 and the second vehicle 40 decreases.

The second vehicle 40 is positioned in a blind spot region as viewed from the first vehicle 30, and thus it can be said that the first vehicle 30 is hardly visible even from the second vehicle 40. Accordingly, the notification control unit 14 may notify the second vehicle 40 of the presence of the first vehicle 30. In this case, the notification control unit 14 selects the rear display device 15b and the side display device 15c as the notification unit 15 to be operated based on the position of the second vehicle 40. Then, the notification control unit 14 causes the rear display device 15b and the side display device 15c to display an object indicating the presence of the first vehicle 30. In this manner, the notification control unit 14 is capable of simultaneously notifying a plurality of surrounding vehicles.

Figure 5:
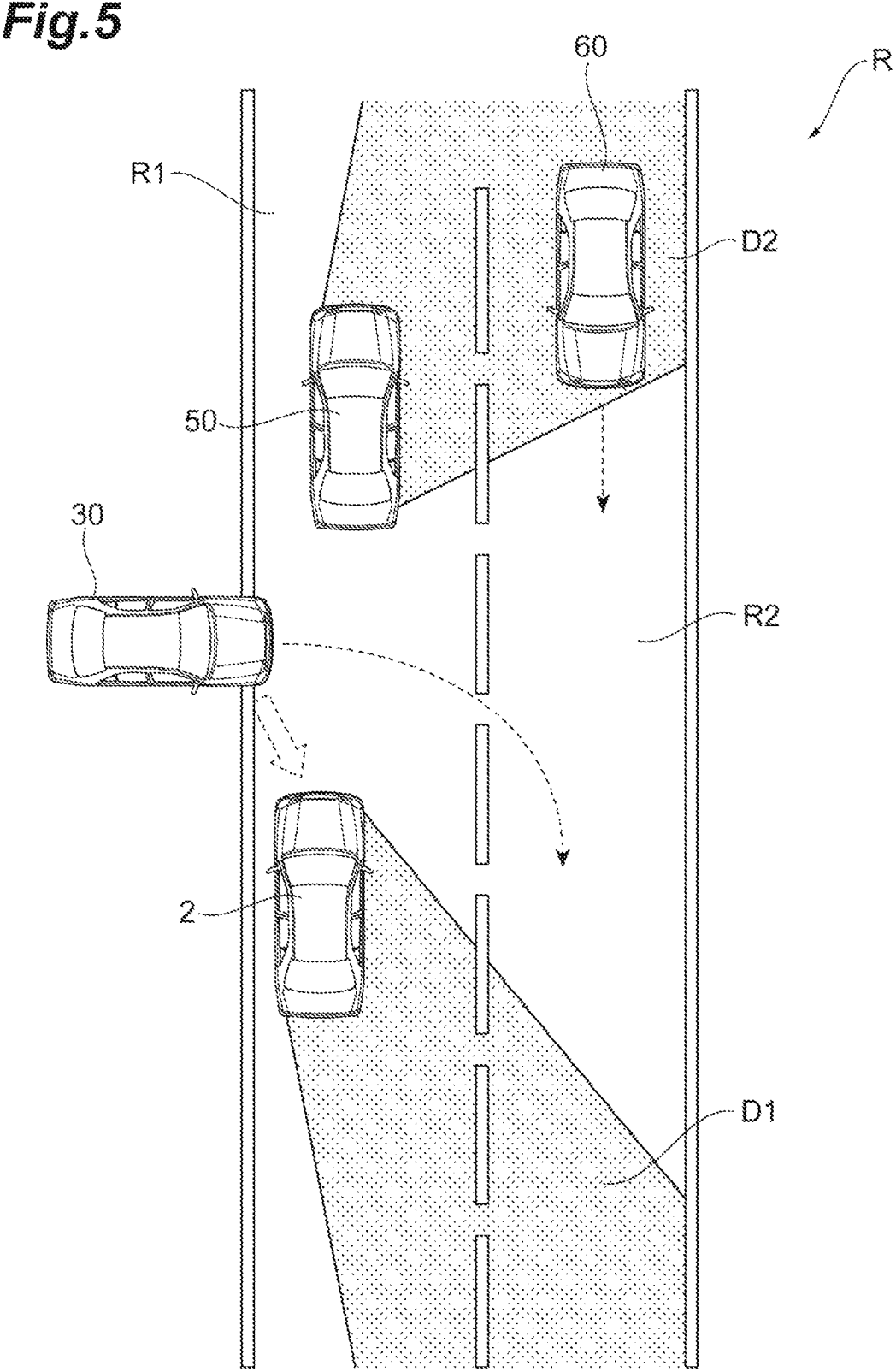
FIG. 5 is a diagram illustrating another example of the driving scene in which the notification device performs notification.

FIG. 5 is a diagram illustrating another example of the driving scene in which the notification device performs notification. In FIG. 5, the vehicle 2 travels in the first lane R1 as a traveling lane on the road R. The road R includes the second lane R2 adjacent to the first lane R1. The second lane R2 is an opposite lane as viewed from the vehicle 2. The first vehicle 30, a third vehicle 50, and a fourth vehicle 60 are present in front of the vehicle 2. The first vehicle 30, the third vehicle 50, and the fourth vehicle 60 are detected by the external sensor 3 of the vehicle 2 and recognized by the recognition unit 11.

The determination unit 12 determines whether or not the first vehicle 30, the third vehicle 50, and the fourth vehicle 60 are entering vehicles. The first vehicle 30 approaches the traveling road of the vehicle 2, the speed of the first vehicle 30 is a low speed equal to or less than a predetermined speed, and the direction indicator of the first vehicle 30 indicates that the first vehicle 30 heads towards the second lane R2 as the opposite lane. Accordingly, the determination unit 12 determines that the first vehicle 30 is an entering vehicle. The third vehicle 50 travels in the same direction as the traveling direction of the vehicle 2 and travels in the same lane, and thus the third vehicle 50 does not pass in front of the vehicle 2 and the determination unit 12 determines that the third vehicle 50 is not an entering vehicle. The fourth vehicle 60 travels in the direction opposite to the traveling direction of the vehicle 2 and travels in the opposite lane with a direction indicator off, and thus the fourth vehicle 60 does not pass in front of the vehicle 2 and the determination unit 12 determines that the fourth vehicle 60 is not an entering vehicle.

The first vehicle 30 is scheduled to enter the second lane R2 by turning to the right to cross the first lane R1. This entering is realized when there is a sufficient gap between the vehicles in the first lane R1 and there is a sufficient gap between the vehicles in the second lane R2. Although the driver of the first vehicle 30 (recognition unit when the first vehicle 30 is an automatic driving vehicle) needs to check the surroundings as to the entering is possible, there is a possibility that it is difficult to see objects other than the vehicle 2 and the third vehicle 50. For example, in the driving scene of FIG. 5, the vehicle 2 blocks the view of the first vehicle 30 (dotted arrow in FIG. 5), and thus the blind spot region D1 is formed behind the vehicle 2. In addition, the third vehicle 50 blocks the view of the first vehicle 30, and thus a blind spot region D2 is formed to the side of the third vehicle 50. In other words, there is a possibility that the first vehicle 30 is incapable of noticing the fourth vehicle 60 even if the fourth vehicle 60 is present to the side of the third vehicle 50.

Figure 6A:
FIG. 6A is a diagram illustrating another example of the notification content of the notification unit.
Figure 6B:
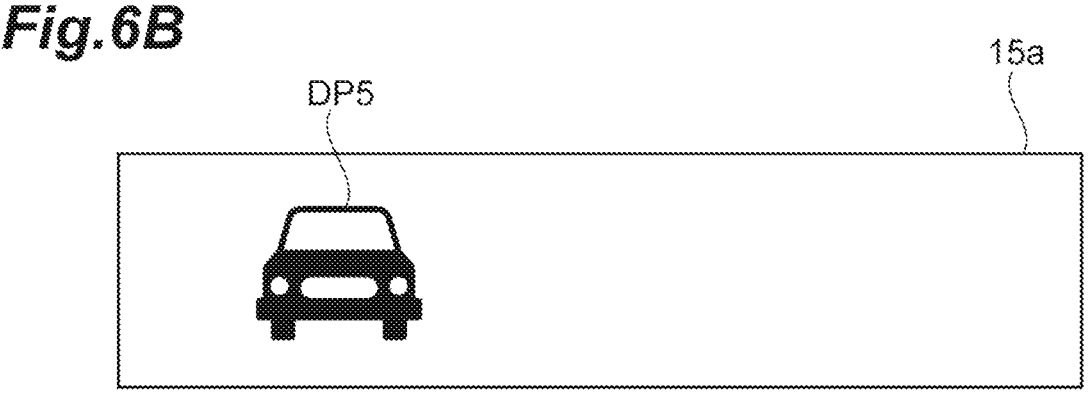
FIG. 6B is another diagram illustrating another example of the notification content of the notification unit.
Figure 6C:
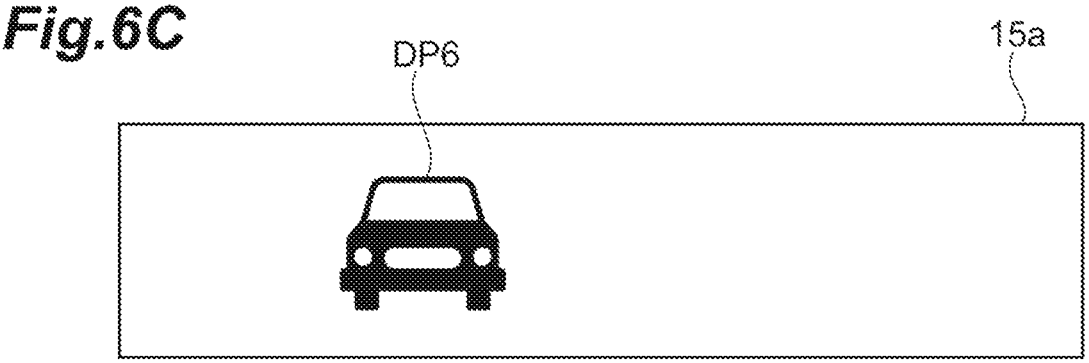
FIG. 6C is another diagram illustrating another example of the notification content of the notification unit.

Accordingly, the notification control unit 14 controls the notification unit 15 to notify the first vehicle 30 of the presence of the fourth vehicle 60. The notification control unit 14 selects the front display device 15a as the notification unit 15 to be operated based on the position of the first vehicle 30. FIGS. 6A to 6C are diagrams illustrating an example of the notification content of the notification unit. FIGS. 6A to 6C are display examples of the front display device 15a, which are arranged in chronological order. The notification control unit 14 determines the position at which information is to be displayed in the display region of the front display device 15a in accordance with the distance between and directions of the fourth vehicle 60 and the vehicle 2. For example, as illustrated in FIG. 6A, a vehicle object DP4 is displayed in the display region near the outside of the front display device 15a. The vehicle object DP4 is information for providing the recognition result of the fourth vehicle 60 as a notification. The display position of the vehicle object is changed in accordance with the distance between the vehicle 2 and the fourth vehicle 60. For example, as illustrated in FIG. 6B, the notification control unit 14 causes a vehicle object DP5 to be displayed inside the vehicle object DP4 illustrated in FIG. 6A. Then, the notification control unit 14 causes a vehicle object DP6 to be displayed inside the vehicle object DP5 illustrated in FIG. 6B with time as illustrated in FIG. 6C. The vehicle objects DP4 to DP6 may be changed to become larger as the distance between the vehicle 2 and the fourth vehicle 60 decreases.

The fourth vehicle 60 is positioned in a blind spot region as viewed from the first vehicle 30, and thus it can be said that the first vehicle 30 is hardly visible even from the fourth vehicle 60. Accordingly, the notification control unit 14 may notify the fourth vehicle 60 of the presence of the first vehicle 30. In this case, the notification control unit 14 selects the front display device 15a as the notification unit 15 to be operated based on the position of the fourth vehicle 60. Then, the notification control unit 14 causes the front display device 15a to display an object indicating the presence of the first vehicle 30. The notification control unit 14 is capable of dividing the display region of the front display device 15a, displaying the recognition result of the fourth vehicle 60 in the display region for the first vehicle 30, and displaying the recognition result of the first vehicle 30 in the display region for the fourth vehicle 60. In this manner, the notification control unit 14 is capable of simultaneously notifying a plurality of surrounding vehicles.

As described with reference to FIGS. 3 to 6C, the notification control unit 14 is capable of causing the notification unit 15 to notify the first vehicle 30 (an example of the entering vehicle) of at least one of information on the second vehicle 40 (an example of the surrounding vehicle) traveling behind the vehicle 2 and information on the fourth vehicle 60 (an example of the surrounding vehicle) traveling in the second lane R2 (an example of the opposite lane). In addition, the notification control unit 14 is capable of causing the notification unit 15 to notify the second vehicle 40 (an example of the surrounding vehicle) traveling behind the vehicle 2 of information on the first vehicle 30 (an example of the entering vehicle). Further, the notification control unit 14 is capable of causing the notification unit 15 to notify the fourth vehicle 60 (an example of the surrounding vehicle) traveling in the second lane R2 (an example of the opposite lane) in front of the vehicle 2 of information on the first vehicle 30 (an example of the entering vehicle). A vehicle control device 20 is configured to be provided with the automatic driving ECU 8 and the notification device 1 described above.

(Operation of Notification Device)

Figure 7:
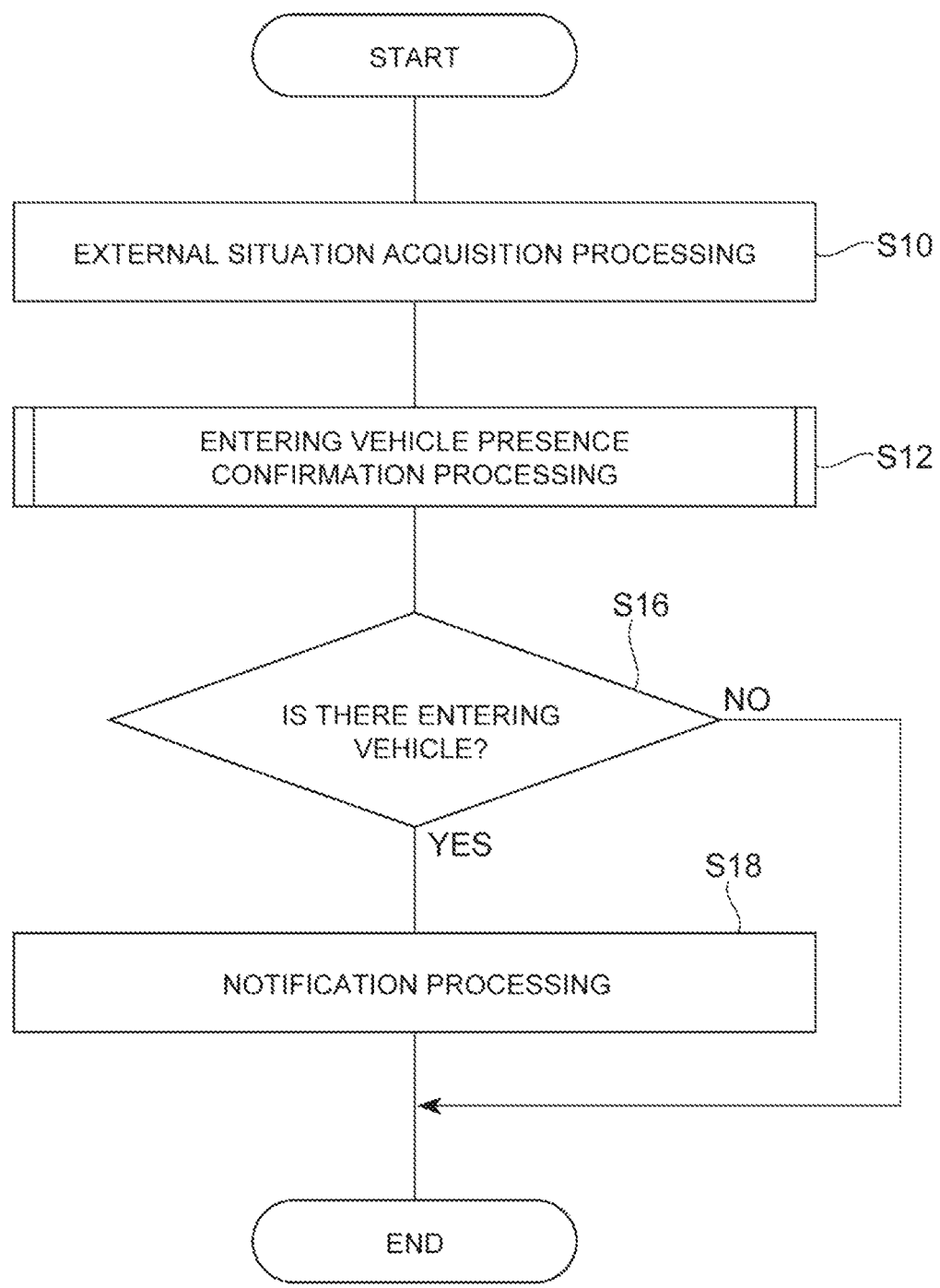
FIG. 7 is a flowchart illustrating an example of an operation of the notification device.

FIG. 7 is a flowchart illustrating an example of the operation of the notification device. The flowchart illustrated in FIG. 7 is executed by the notification ECU 10 of the notification device 1. The notification ECU 10 initiates the processing when, for example, a notification start button is turned ON by a driver performing an operation.

As illustrated in FIG. 7, the recognition unit 11 of the notification ECU 10 acquires information on an object around the vehicle 2 detected by the external sensor 3 as external situation acquisition processing (S10). Then, the recognition unit 11 determines whether or not the object is a plurality of surrounding vehicles. When the detected object is a plurality of surrounding vehicles, the recognition unit 11 recognizes the positions, the traveling directions, the speeds, and the like of the plurality of surrounding vehicles.

Figure 8:
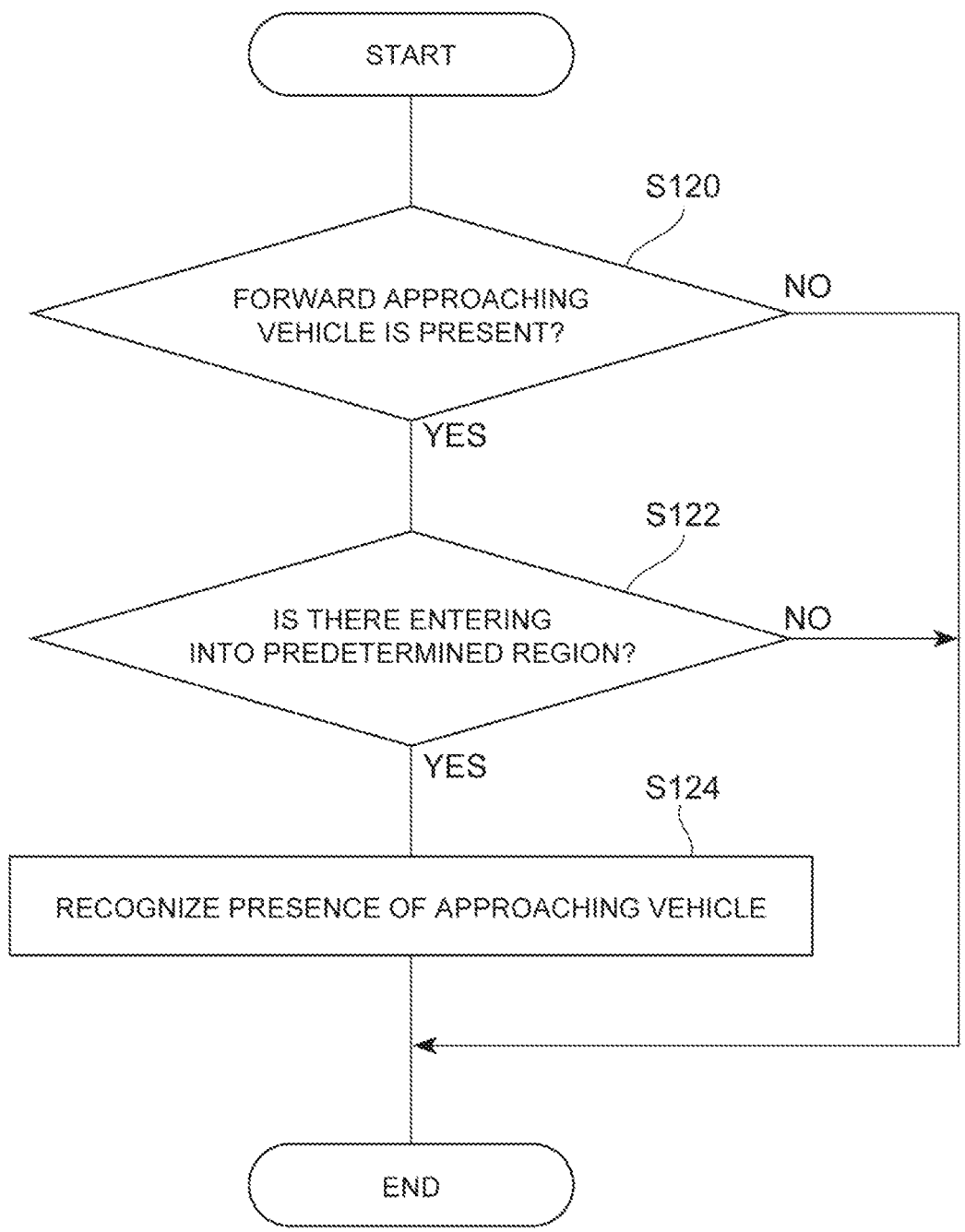
FIG. 8 is a flowchart illustrating an example of entering vehicle presence confirmation processing.

Subsequently, the determination unit 12 of the notification ECU 10 determines, as entering vehicle presence confirmation processing (S12), whether or not at least one of the plurality of surrounding vehicles recognized in the external situation acquisition processing (S10) is an entering vehicle going to pass in front of the vehicle 2. Details of the entering vehicle presence confirmation processing (S12) are illustrated in FIG. 8. FIG. 8 is a flowchart illustrating an example of the entering vehicle presence confirmation processing. As illustrated in FIG. 8, the determination unit 12 determines, as forward approaching vehicle determination processing (S120), whether or not a vehicle approaching the vehicle 2 is present in front of the vehicle 2. The determination unit 12 determines, for example, whether or not a surrounding vehicle is present in front of the vehicle 2. Subsequently, when a surrounding vehicle is present in front of the vehicle 2, the determination unit 12 determines whether or not the surrounding vehicle approaches the vehicle 2. The determination unit 12 determines whether or not the surrounding vehicle approaches the vehicle 2 based on, for example, the traveling direction of the surrounding vehicle, the direction of the vehicle, and the speed of the vehicle. When the determination unit 12 determines that the surrounding vehicle in front of the vehicle approaches the vehicle 2, the determination unit 12 determines that the surrounding vehicle is a forward approaching vehicle.

When the determination unit 12 determines that the forward approaching vehicle is present (S120: YES), the determination unit 12 determines, as determination processing (S122) related to entering into a predetermined region, whether or not the forward approaching vehicle is scheduled to enter a predetermined region. The predetermined region is the lane opposite to the vehicle 2 or the lane closer to the road middle side than the traveling lane of the vehicle 2. The determination unit 12 determines whether or not the forward approaching vehicle enters the predetermined region based on the direction of the forward approaching vehicle, the traveling direction of the forward approaching vehicle, the lighting state of a direction indicator, and the like.

When the determination unit 12 determines that the forward approaching vehicle enters the predetermined region (S122: YES), the determination unit 12 recognizes the forward approaching vehicle as an entering vehicle as confirmation processing (S124). For example, the determination unit 12 adds information indicating that the vehicle is an entering vehicle to the recognition result of the forward approaching vehicle.

The flowchart illustrated in FIG. 8 is terminated when the confirmation processing (S124) is completed and the determination unit 12 determines that no forward approaching vehicle is present (S120: NO) or the determination unit 12 determines that the forward approaching vehicle does not enter the predetermined region (S122: NO).

Returning to FIG. 7, the notification control unit 14 of the notification ECU 10 determines, as entering vehicle determination processing (S16), whether or not the entering vehicle is confirmed in the entering vehicle presence confirmation processing (S12). For example, the notification control unit 14 determines the presence or absence of the entering vehicle by determining, from the recognition result, whether or not a vehicle is present to which the information indicating the entering vehicle is added.

When the notification control unit 14 determines that the entering vehicle is present (S16: YES), the notification control unit 14 causes the notification unit 15 to notify the entering vehicle of the recognition result of the recognition unit 11 as notification processing (S18).

The flowchart illustrated in FIG. 7 is terminated when the notification processing (S18) is completed or when the notification control unit 14 determines that the entering vehicle is not present (S16: NO).

As described above, according to the notification device 1 of the first embodiment, an entering vehicle is notified of the recognition result of the recognition unit 11 when it is determined that at least one of a plurality of surrounding vehicles is the entering vehicle. Accordingly, the notification device 1 is capable of causing the entering vehicle to grasp the situation of the surrounding vehicle other than the vehicle 2 equipped with the notification device 1. As a result, the notification device 1 contributes to traffic facilitation.

In addition, the notification device 1 is capable of causing the entering vehicle to grasp a surrounding vehicle traveling in the opposite lane or behind the vehicle 2. Further, the notification device 1 is capable of causing a surrounding vehicle traveling in the opposite lane to grasp an entering vehicle and is capable of causing a surrounding vehicle traveling behind the vehicle 2 to grasp an entering vehicle.

Second Embodiment

A notification device 1A according to a second embodiment is identical to the notification device 1 according to the first embodiment except that the notification device 1A is provided with an object determination unit 13 and the notification control unit 14 determines whether or not to perform notification based on the result of the object determination unit 13. The following description will focus on the differences from the first embodiment without redundant description.

(Configurations of Vehicle and Notification Device)

Figure 9:
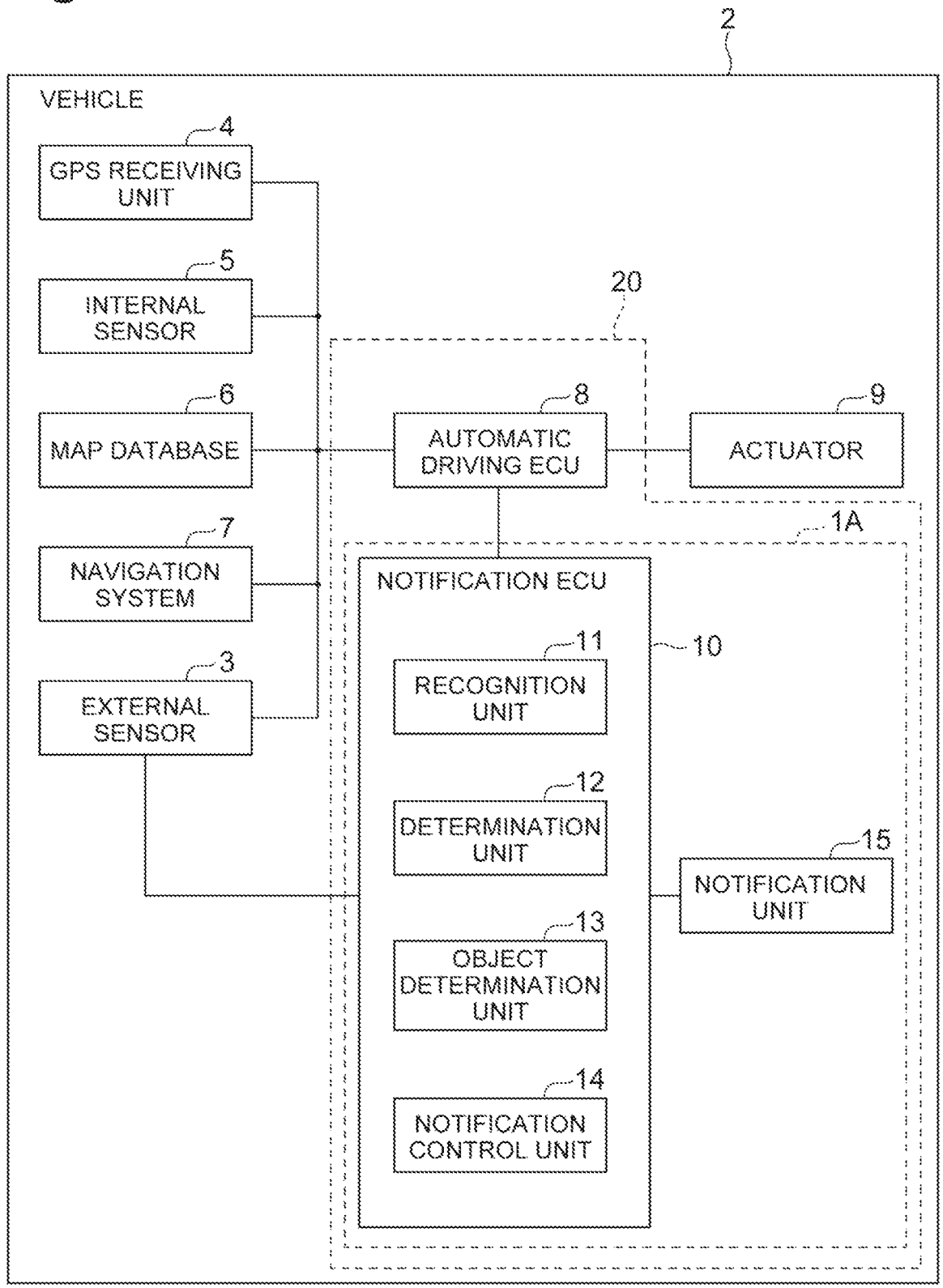
FIG. 9 is a functional block diagram of an example of a vehicle including a notification device according to a second embodiment.

FIG. 9 is a functional block diagram of an example of a vehicle including a notification device according to the second embodiment. As illustrated in FIG. 9, the notification ECU 10 is provided with the object determination unit 13. The object determination unit 13 determines whether or not a surrounding vehicle is present in a blind spot region corresponding to an entering vehicle. The object determination unit 13 specifies the blind spot region corresponding to the entering vehicle based on the positional relationship of objects around the entering vehicle by using the recognition result of the recognition unit 11. For example, in FIG. 3, the object determination unit 13 specifies that the blind spot region D1 is present behind the vehicle 2 based on the positions of the first vehicle 30 and the vehicle 2. For example, in FIG. 5, the object determination unit 13 specifies that the blind spot region D2 is present to the side of the third vehicle 50 based on the positions of the first vehicle 30 and the third vehicle 50. Then, the object determination unit 13 determines whether or not a surrounding vehicle is present in a blind spot region by using the recognition result of the recognition unit 11.

When the object determination unit 13 determines that a surrounding vehicle is present in a blind spot region, the notification control unit 14 causes the notification unit 15 to notify an entering vehicle of information on the surrounding vehicle present in the blind spot region. In other words, in the second embodiment, the entering vehicle is notified of only a surrounding vehicle included in a blind spot region. The other configurations of the notification device according to the second embodiment are the same as those of the notification device 1 according to the first embodiment. The vehicle 2 equipped with the notification device according to the second embodiment is the same as the vehicle 2 equipped with the notification device 1 according to the first embodiment.

(Operation of Notification Device)

Figure 10:
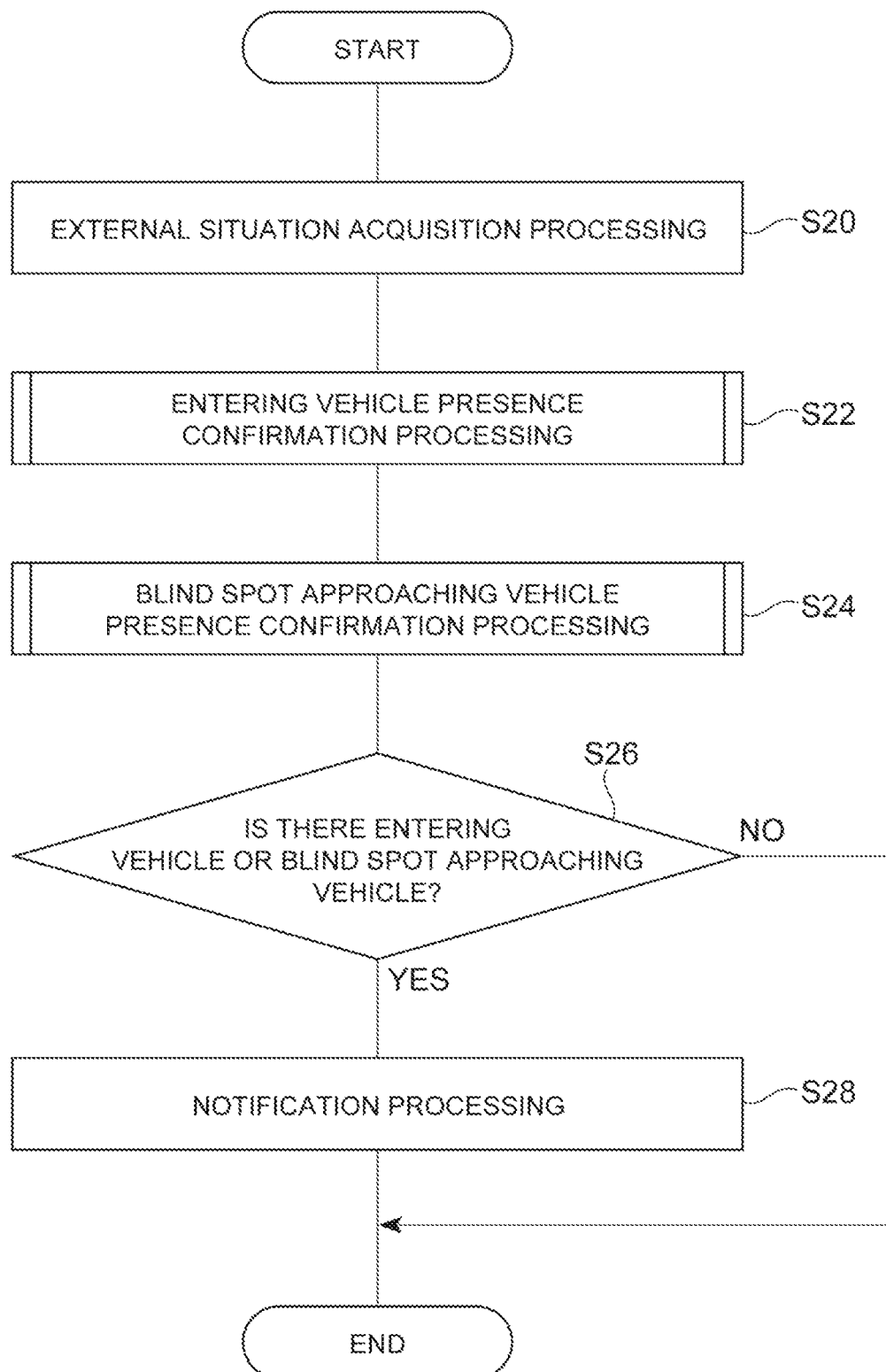
FIG. 10 is a flowchart illustrating an example of an operation of the notification device.

FIG. 10 is a flowchart illustrating an example of the operation of the notification device. The flowchart illustrated in FIG. 10 is executed by the notification ECU 10 of the notification device. The notification ECU 10 initiates the processing when, for example, a notification start button is turned ON by a driver performing an operation.

As illustrated in FIG. 10, the notification ECU 10 initiates the processing from external situation acquisition processing (S20). The external situation acquisition processing (S20) and entering vehicle presence confirmation processing (S22) are the same as the external situation acquisition processing (S10) and the entering vehicle presence confirmation processing (S12) illustrated in FIG. 7.

Figure 11:
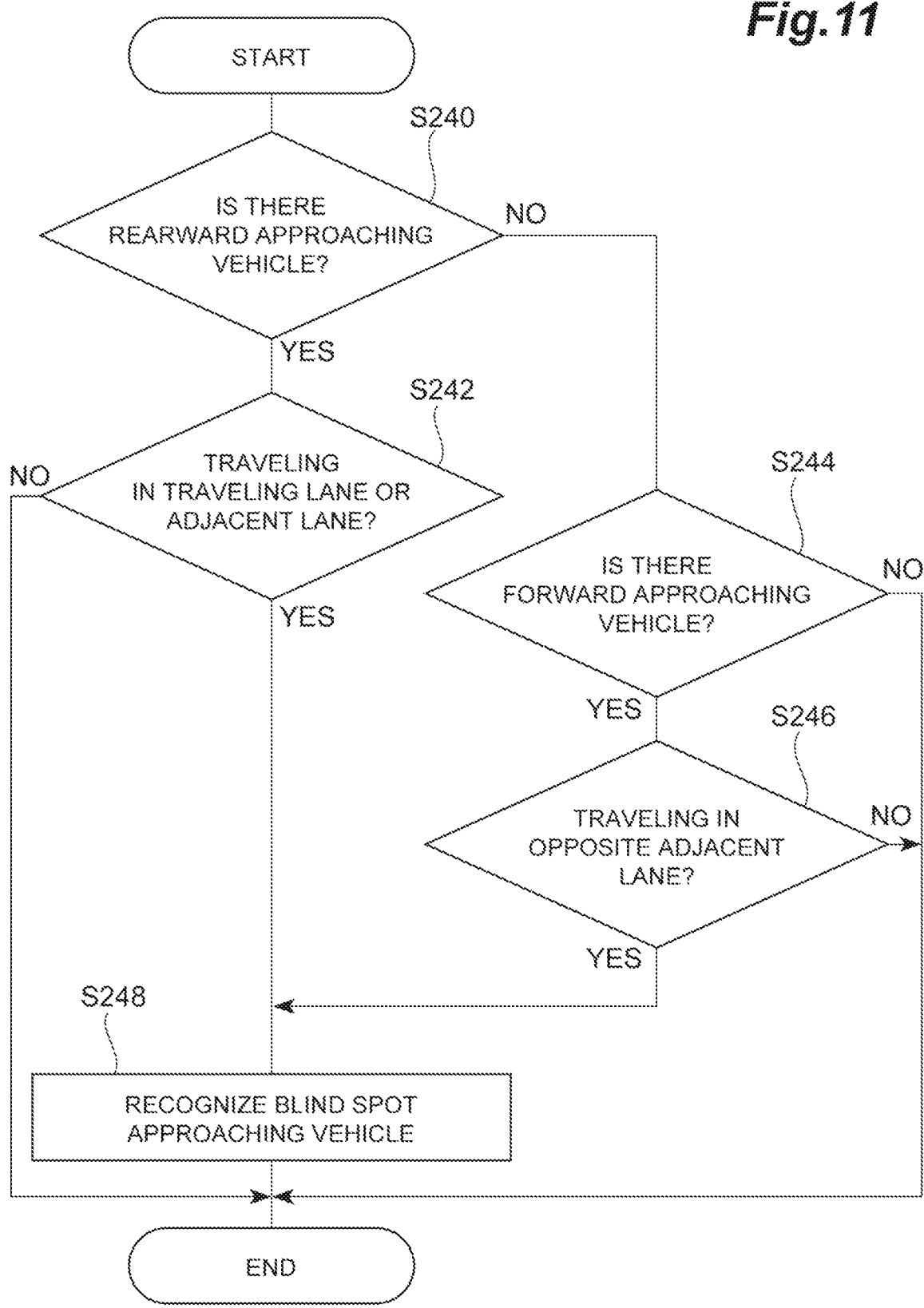
FIG. 11 is a flowchart illustrating an example of blind spot approaching vehicle presence confirmation processing.

When the entering vehicle presence confirmation processing (S22) is completed, the object determination unit 13 of the notification ECU 10 executes blind spot approaching vehicle presence confirmation processing (S24). A blind spot approaching vehicle is a vehicle present in a blind spot region and approaching the vehicle 2. Details of the blind spot approaching vehicle presence confirmation processing (S24) are illustrated in FIG. 11. FIG. 11 is a flowchart illustrating an example of the blind spot approaching vehicle presence confirmation processing. As illustrated in FIG. 11, the object determination unit 13 first determines whether or not a surrounding vehicle is present behind the vehicle 2 as rearward approaching vehicle determination processing (S240). Subsequently, when a surrounding vehicle is present behind the vehicle 2, the determination unit 12 determines whether or not the surrounding vehicle approaches the vehicle 2. The determination unit 12 determines whether or not the surrounding vehicle approaches the vehicle 2 based on, for example, the traveling direction of the surrounding vehicle, the direction of the vehicle, and the speed of the vehicle. When the determination unit 12 determines that the surrounding vehicle behind the vehicle 2 approaches the vehicle 2, the determination unit 12 determines that the surrounding vehicle is a rearward approaching vehicle.

When the determination unit 12 determines that the rearward approaching vehicle is present (S240: YES), the object determination unit 13 determines, as position determination processing (S242), whether or not the rearward approaching vehicle travels in the traveling lane of the vehicle 2 or an adjacent lane (lane having the same traveling direction as the traveling lane). When the object determination unit 13 determines that the rearward approaching vehicle travels in the traveling lane of the vehicle 2 or an adjacent lane, the object determination unit 13 recognizes the rearward approaching vehicle as a blind spot approaching vehicle as confirmation processing (S248). In the example of FIG. 3, the second vehicle 40 is a blind spot approaching vehicle.

When the determination unit 12 determines that the rearward approaching vehicle is not present (S240: NO), the object determination unit 13 determines whether or not a surrounding vehicle is present in front of the vehicle 2 as forward approaching vehicle determination processing (S244). Subsequently, when a surrounding vehicle is present in front of the vehicle 2, the determination unit 12 determines whether or not the surrounding vehicle approaches the vehicle 2. The determination unit 12 determines whether or not the surrounding vehicle approaches the vehicle 2 based on, for example, the traveling direction of the surrounding vehicle, the direction of the vehicle, and the speed of the vehicle. When the determination unit 12 determines that a surrounding vehicle in front of the vehicle 2 approaches the vehicle 2 (S244: YES), the determination unit 12 determines that the surrounding vehicle is a forward approaching vehicle.

When the object determination unit 13 determines that a forward approaching vehicle is present (S244: YES), the object determination unit 13 determines, as position determination processing (S246), whether or not a forward approaching vehicle travels in the lane opposite to the vehicle 2 (or an opposite adjacent lane). When the object determination unit 13 determines that a forward approaching vehicle travels in the lane opposite to the vehicle 2 (S246: YES), the object determination unit 13 recognizes the forward approaching vehicle as a blind spot approaching vehicle as the confirmation processing (S248). In the example of FIG. 5, the fourth vehicle 60 is a blind spot approaching vehicle.

The flowchart illustrated in FIG. 11 is terminated when the confirmation processing (S248) is completed and the determination unit 12 determines that no rearward approaching vehicle travels in the traveling lane of the vehicle 2 or an adjacent lane (S242: NO), the determination unit 12 determines that no forward approaching vehicle is present (S244: NO), or the determination unit 12 determines that no forward approaching vehicle travels in the opposite lane (S246: NO).

Returning to FIG. 10, the notification control unit 14 of the notification ECU 10 determines, as entering vehicle determination processing (S26), whether or not an entering vehicle is confirmed in the entering vehicle presence confirmation processing (S12) and a blind spot approaching vehicle is present. For example, the notification control unit 14 executes the entering vehicle determination processing (S26) based on information indicating the entering vehicle given to the recognition result of the surrounding vehicle and information indicating the blind spot approaching vehicle. When the entering vehicle is confirmed and the notification control unit 14 determines that the blind spot approaching vehicle is present (S26: YES), the notification control unit 14 causes the notification unit 15 to notify the entering vehicle of the recognition result of the recognition unit 11 as notification processing (S28). The notification processing (S28) is the same as the notification processing (S18) illustrated in FIG. 7.

The flowchart illustrated in FIG. 10 is terminated when the notification processing (S28) is completed or when no entering vehicle is confirmed or it is determined that no blind spot approaching vehicle is present (S26: NO).

As described above, according to the notification device 1A of the second embodiment, an entering vehicle is capable of grasping a situation of a surrounding vehicle in a blind spot region.

Third Embodiment

The vehicle control device 20 according to a third embodiment is identical to the vehicle control device 20 according to the first embodiment except that a notification is provided for an entering vehicle when the traveling of the entering vehicle is given priority during automatic driving. The following description will focus on the difference from the first embodiment without redundant description.

(Configuration of Vehicle Control Device)

The configuration of the vehicle 2 equipped with the vehicle control device 20 according to the third embodiment is identical to the configuration of the vehicle 2 according to the first embodiment. The automatic driving ECU 8 is identical to the automatic driving ECU 8 according to the first embodiment except that the automatic driving ECU 8 according to the third embodiment has a function of determining whether or not to prioritize the traveling of an entering vehicle over the traveling of the vehicle 2. For example, the automatic driving ECU 8 determines that the traveling of the entering vehicle is given priority when the time of arrival at a destination falls within an allowable range even if priority is given to the traveling of the entering vehicle or when there is no change in future traveling speed even if priority is given to the traveling of the entering vehicle. In this case, the automatic driving ECU 8 may stop the vehicle 2 by operating the actuator 9.

The configuration of the notification device 1 according to the third embodiment is identical to the configuration of the notification device 1 according to the first embodiment except for some of the functions of the notification control unit 14. When the notification control unit 14 determines that priority is given to the traveling of the entering vehicle, the notification control unit 14 causes the notification unit 15 to notify the entering vehicle of the recognition result of the recognition unit 11.

(Operation of Vehicle Control Device)

Figure 12:
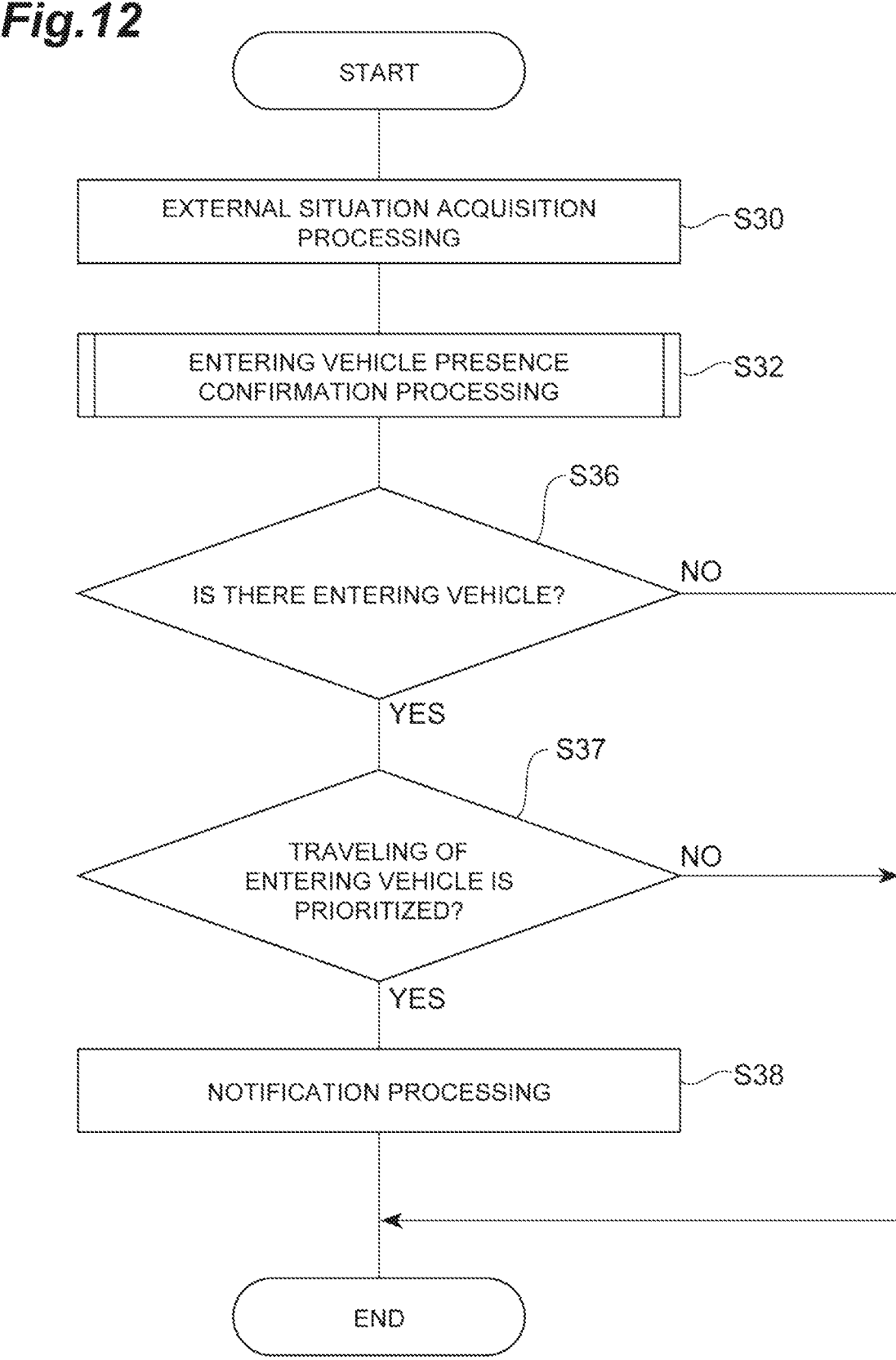
FIG. 12 is a flowchart illustrating an example of an operation of a vehicle control device according to a third embodiment.

FIG. 12 is a flowchart illustrating an example of the operation of the vehicle control device 20 according to the third embodiment. The flowchart shown in FIG. 12 is executed by the vehicle control device 20. The vehicle control device 20 initiates the processing when, for example, a notification start button is turned ON by a driver performing an operation.

As illustrated in FIG. 12, the notification ECU 10 of the vehicle control device 20 initiates the processing from external situation acquisition processing (S30). The external situation acquisition processing (S30), entering vehicle presence confirmation processing (S32), and entering vehicle determination processing (S36) are the same as the external situation acquisition processing (S10), the entering vehicle presence confirmation processing (S12), and the entering vehicle determination processing (S16) illustrated in FIG. 7.

When the automatic driving ECU 8 determines in the entering vehicle determination processing (S36) that an entering vehicle is present (YES), the automatic driving ECU 8 determines whether not to prioritize the traveling of the entering vehicle as priority determination processing (S37). Notification processing (S38) is executed when the automatic driving ECU 8 determines that the traveling of the entering vehicle is prioritized (S37: YES). The notification processing (S38) is the same as the notification processing (S18) illustrated in FIG. 7.

The flowchart illustrated in FIG. 12 is terminated when the notification processing (S38) is completed and when it is determined that no entering vehicle is present (S36: NO) or when it is determined that no priority is given to the traveling of the entering vehicle (S37: NO).

As described above, according to the vehicle control device 20 of the third embodiment, an entering vehicle is notified of the recognition result of the recognition unit 11 when the automatic driving ECU 8 determines that priority is given to the traveling of the entering vehicle over the traveling of the vehicle 2. Accordingly, the vehicle control device 20 is capable of causing an entering vehicle traveling with priority to grasp a situation of a surrounding vehicle other than the vehicle 2 equipped with the notification device 1. As a result, the vehicle control device 20 contributes to traffic facilitation.

Fourth Embodiment

A notification device according to a fourth embodiment is identical to the notification device 1 according to the first embodiment except that the content of notification is changed when an entering vehicle is an automatic driving vehicle. The following description will focus on the difference from the first embodiment without redundant description.

The configuration of the notification device according to the fourth embodiment is identical to the configuration of the notification device 1 according to the first embodiment except for some of the functions of the determination unit 12 and the notification control unit 14. The determination unit 12 determines whether or not at least one of a plurality of surrounding vehicles is an entering vehicle based on information (such as a planned path) obtained via inter-vehicle communication. When the entering vehicle is an automatic driving vehicle, the notification control unit 14 changes the method for transmitting a notification to the entering vehicle from display to communication. In other words, the notification control unit 14 does not perform the display for the entering vehicle by means of the front display device 15a and provides information via inter-vehicle communication. The notification transmission method is the only difference between the operation of the notification device according to the fourth embodiment and the operation of the notification device 1 according to the first embodiment. According to the notification device of the fourth embodiment, an entering vehicle is capable of grasping a situation of a surrounding vehicle in a blind spot region. In addition, the change in notification transmission method according to the fourth embodiment is applicable to the notification device of the second embodiment and the vehicle control device of the third embodiment.

Although various exemplary embodiments have been described above, various omissions, substitutions, and changes may be made without limitation to the exemplary embodiments described above.

For example, the vehicle 2 is not limited to a vehicle traveling by automatic driving and may be at least one of a vehicle having a traveling support function for a driver and a general vehicle having no automatic driving or support function.

The recognition unit 11 may perform recognition based on information obtained via communication as well as the detection result of the external sensor 3. For example, the path of the entering vehicle can be acquired when the entering vehicle is an automatic driving vehicle. In this case, the accuracy of the determination of the entering vehicle is improved.

The notification unit 15 does not necessarily have to be provided outside the vehicle 2 and may be provided in the vehicle such as the inside of the windshield insofar as information notification can be performed toward the outside of the vehicle. The notification unit 15 may perform text-based information notification. The notification unit 15 is not limited to a display device and may be a light source device such as a lamp. In this case, the notification unit 15 is capable of performing information notification in a lighted state. Alternatively, the notification unit 15 may be a projector displaying an optical paint on a road surface. In this case, the notification unit 15 is capable of projecting information to be displayed on the display device on a road surface.

What is claimed is:

1. A notification device which is provided in a vehicle having a front display device, a rear display device, and a side display device, and the notification device provides information as a notification with respect to surrounding vehicles present around the vehicle, the notification device comprising:
    a recognition unit configured to recognize a plurality of the surrounding vehicles;
    a notification unit configured to provide the information as a notification toward an outside of the vehicle;
    a determination unit configured to determine whether or not at least one of the plurality of surrounding vehicles recognized by the recognition unit is an entering vehicle going to pass in front of the vehicle; and
    a notification control unit configured to select one or more of the front display device, the rear display device, and the side display device of the vehicle to display the notification based on a distance between the vehicle and the entering vehicle, and cause the notification unit to notify the entering vehicle of a recognition result of the recognition unit when the determination unit determines that at least one of the plurality of surrounding vehicles is the entering vehicle by displaying the notification on the selected one or more of the front display device, the rear display device, and the side display device of the vehicle, wherein:
    the entering vehicle is a surrounding vehicle going to cross a traveling lane of the vehicle and enter an opposite lane opposite to the traveling lane,
    a first travel direction of the vehicle traveling in the traveling lane is opposite to a second travel direction of the surrounding vehicle traveling in the opposite lane, and
    the notification control unit is configured to cause the notification unit to notify the entering vehicle of at least one of information on a surrounding vehicle traveling behind the vehicle and information on a surrounding vehicle traveling in the opposite lane.

2. The notification device according to claim 1, comprising an object determination unit configured to determine whether or not the surrounding vehicle is present in a blind spot region corresponding to the entering vehicle,
    wherein the notification control unit is configured to cause the notification unit to notify the entering vehicle of information on the surrounding vehicle present in the blind spot region when the object determination unit determines that the surrounding vehicle is present in the blind spot region.

3. The notification device according to claim 1, wherein the notification control unit is configured to cause the notification unit to notify the surrounding vehicle traveling in the opposite lane in front of the vehicle of information on the entering vehicle.

4. The notification device according to claim 3, wherein the notification control unit is configured to cause the notification unit to notify the surrounding vehicle traveling behind the vehicle of information on the entering vehicle.

5. The notification device according to claim 1, wherein the notification control unit is configured to cause the notification unit to notify the surrounding vehicle traveling behind the vehicle of information on the entering vehicle.

6. A vehicle control device causing a vehicle having a front display device, a rear display device, and a side display device, to travel by automatic driving, the vehicle control device comprising:
    a recognition unit configured to recognize a plurality of surrounding vehicles present around the vehicle;
    a notification unit configured to provide information as a notification toward an outside of the vehicle;
    a determination unit configured to determine whether or not at least one of the plurality of surrounding vehicles recognized by the recognition unit is an entering vehicle going to pass in front of the vehicle;
    an automatic driving unit configured to determine whether or not to prioritize traveling of the entering vehicle over traveling of the vehicle when the determination unit determines that at least one of the plurality of surrounding vehicles is the entering vehicle; and a notification control unit configured to select one or more of the front display device, the rear display device, and the side display device of the vehicle to display the notification based on a distance between the vehicle and the entering vehicle, and cause the notification unit to notify the entering vehicle of a recognition result of the recognition unit when the automatic driving unit determines that traveling of the entering vehicle is prioritized over traveling of the vehicle by displaying the notification on the selected one or more of the front display device, the rear display device, and the side display device of the vehicle, wherein:

the entering vehicle is a surrounding vehicle going to cross a traveling lane of the vehicle and enter an opposite lane opposite to the traveling lane, a first travel direction of the vehicle traveling in the traveling lane is opposite to a second travel direction of the surrounding vehicle traveling in the opposite lane, and the notification control unit is configured to cause the notification unit to notify the entering vehicle of at least one of information on a surrounding vehicle traveling behind the vehicle and information on a surrounding vehicle traveling in the opposite lane.

* * * * *